Aug. 20, 1963 M. J. FRIED 3,101,443
CAPACITANCE VOLTAGE DIVIDER
Filed Nov. 6, 1961
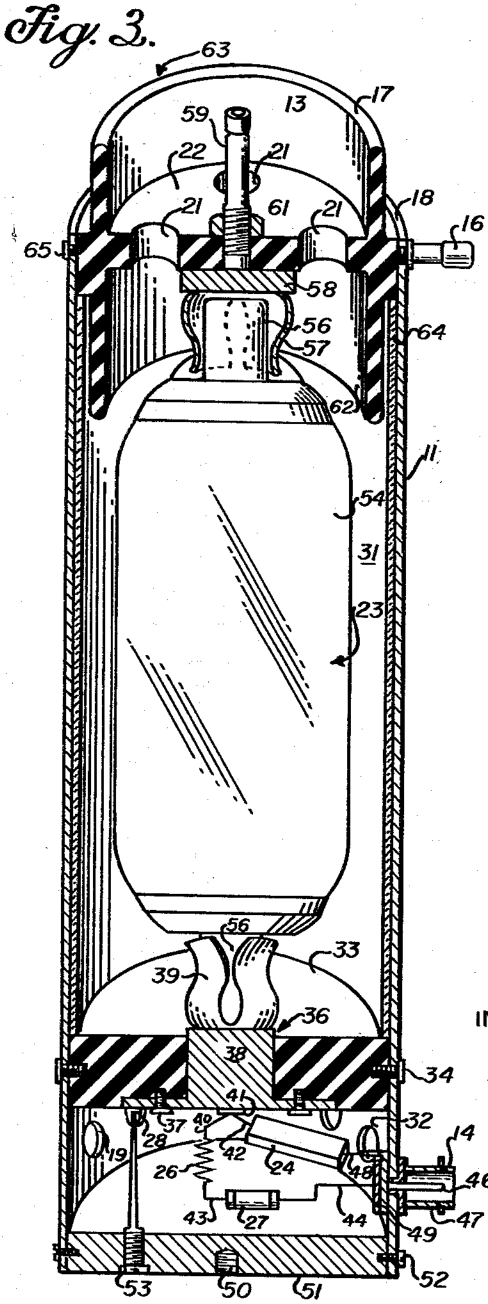
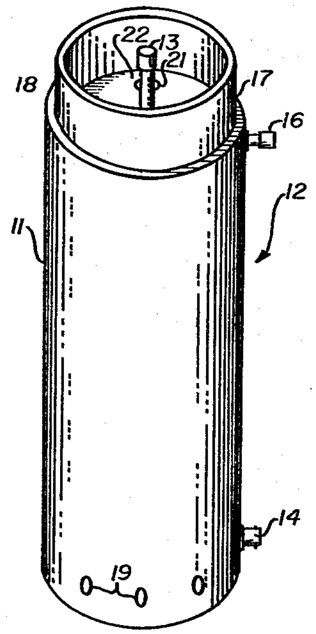
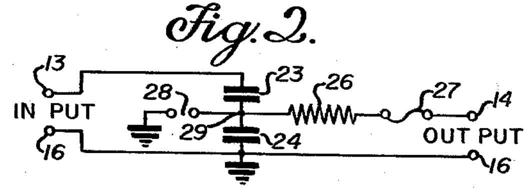
INVENTOR.
MORTON J. FRIED
BY
Fryer & Tjensvold
ATTORNEYS

United States Patent Office 3,101,443

Patented Aug. 20, 1963

3,101,443

CAPACITANCE VOLTAGE DIVIDER

Morton J. Fried, 3879 Madeira Way, Livermore, Calif.

Filed Nov. 6, 1961, Ser. No. 150,380
9 Claims. (Cl. 323—74)

The present invention relates to electrical voltage dividers and more particularly to capacitive voltage dividers utilized in conjunction with high voltages.

Diagnostic investigation of electrical signals requires the use of numerous sensing instruments and recording devices. These electrical instruments and devices are for the most part designed to accept and respond to electrical signals having voltage potentials of a few hundred volts or less. Electrical signals having higher voltage potentials result in either damage to the equipment or inaccurate information due to instrument operation outside of its designed limits.

The problem presented when an electrical signal of many hundreds or thousands of volts contains information which it is desirable to extract or record, is not solved by merely designing equipment with greater operating limits. The operating limits of most diagnostic equipment is set, not arbitrarily, but by the components which make up the instrument. Vacuum tubes, cathode ray tubes, transistors, photo tubes, resistors, capacitors, etc., all have limits as to the voltages at which they can operate and consequently limit the instruments of which they are a part. Thus diagnostics of signals having high voltages require that the signal be operated on to reduce its voltage magnitude before it is presented to the various instruments and devices for obtaining desired data.

Although voltage division by means of resistive elements (resistors) is the common method for reducing voltage magnitudes, this method has a number of serious limitations when electrical signals which have magnitudes in the kilovolt region and frequencies in the megacycle region are under investigation. The most serious limitation of resistors is their inability to produce the necessary voltage division (1000 to 1 or more) of a high frequency signal without greatly distorting the shape of the signal due to the large inductance inherent in resistive devices having the ability to handle high voltages and large power dissipations. Since it is desirable to greatly reduce the magnitude of the signal and at the same time maintain the signal shape as nearly as possible, voltage division by capacitive elements, rather than resistive elements, is preferable.

When a signal voltage is applied across a pair of capacitors connected in series, the voltage across each capacitor is inversely proportional to the ratio of its capacitance to the combined capacitance of the two capacitors, regardless of the signal frequency or shape. Since the intrinsic inductance of some types of capacitors, even those rated as high as 35 kv. (kilovolts) is very small, large voltage reduction with minimum distortion is achieved.

When the electrical signal under study is a sinusoidal signal with low harmonic content, capacitance dividers as known in the art perform the desired voltage division with a minimum of undesirable side effects. When, however, the signal to be studied and analyzed is a fast rise time pulse or other signal having high harmonic content, capacitance dividers known in the art experience an oscillating effect, known as ringing, which all but obliterates the signal being operated on. Another characteristic of capacitance dividers used in conjunction with high energy (high voltage) pulse signals, is the danger presented when a system failure causes large quantities of energy from the signal source to be absorbed by the capacitors of the divider network. A capacitance divider characteristically includes a vacuum capacitor having a high voltage rating and which serves to "drop" the high voltage. When this capacitor fails, as by short circuiting or losing vacuum, etc., it is highly possible for enough energy to be absorbed by the capacitance divider system to cause vaporization of components at a rate sufficient to result in an explosion.

Because of the high voltages involved and high frequencies encountered in the use of capacitance dividers, stray signals are often radiated into and from the vacuum capacitor. When attendant apparatus of a sensitive nature is used, these stray signals can be strong enough to be picked up and enter the system in the form of noise. Under certain conditions this source of noise can greatly reduce the accuracy of the information obtained.

Accordingly, it is an object of the present invention to provide a capacitance voltage divider for decreasing the magnitude of high voltage electrical signals, wherein signals having high harmonic content will not induce the system to ring.

Another object of the present invention is to provide a capacitance voltage divider which is packaged in such a manner as to provide safety in case of component failure and eliminate undesirable side effects from signals having high harmonic content.

It is a further object of the present invention to provide a capacitance voltage divider capable of reducing a fast rise time electrical signal voltage by a large factor, e.g. 1000, without attendant ringing. Another object of this invention is to provide a high voltage capacitance divider which cannot introduce noise by way of radiated signals into an attendant system.

Further and more specific objects and advantages of the invention are made apparent in the following specification wherein a preferred form of the invention is described by reference to the accompanying drawing.

FIG. 1 is an isometric view of the capacitor divider of the present invention;

FIG. 2 is an electrical circuit diagram of the capacitor divider of the present invention; and FIG. 3 is a vertical section view of FIG. 1.

Referring now to FIG. 1, a rigid cylindrical, metal housing 11 contains the electrical components of the capacitance divider 12 of the present invention. A high voltage input terminal 13, coaxial output connector 14 and common ground connector 16 provide means for gaining electrical access to the components contained within housing 11. A cylinder of insulating material 17 extends beyond the upper edge 18 of housing 11 approximately the same distance as high voltage input terminal 13. The high voltage input terminal is thereby completely surrounded by insulating material to prevent the occurrence of arcing between terminal 13 and housing 11, or other metallic objects in close proximity. A plurality of port holes 19 in the lower portion of housing 11 provide escape means for gases which might otherwise build up high enough pressures to cause an explosion when an electrical failure took place. Similar port holes 21 are provided in the upper end closure 22 for the same reason. It will become obvious from the following description that the cylindrical geometry of housing 11 is not a necessary requirement of the invention but rather one that lends itself well with the other components.

Referring now to FIG. 2, a high voltage signal to be reduced in magnitude before being introduced into an analyzing system or the like is placed across input terminals 13, 16. The high voltage signal thus occurs across the series connection of capacitors 23 and 24 to which terminals 13, 16 are connected, respectively. The output from the capacitance voltage divider 11 appears at terminals 14, 16 which are connected at either end of capacitor 24 and therefore makes accessible the voltage which appears across capacitor 24. The apparatus (not shown)

to receive the signal from output terminals 14, 16 should have a high input impedance, or an intermediary circuit for establishing a high impedance load for divider 11 should be furnished. A resistor 26 in series with output terminal 14 and capacitor 23, and disposed therebetween, while not necessary is most helpful in reducing ringing when high frequency signals are being acted upon. Capacitor 23 is of the high voltage, low capacitance variety. Such capacitors are characteristically vacuum capacitors having capacitance ratings in the micro-micro farad region and voltage ratings of up to 35 kilovolts. Capacitor 24, on the other hand, is of the low inductance variety, such as mica or ceramic capacitors, and need have a voltage rating of only 100 volts or so. The ratio between the capacitance value of capacitor 24 and the capacitance value of capacitor 23 will be the ratio by which the input voltage is reduced in reaching the output. Thus if capacitor 23 is, for example, a 10 micromicrofarad capacitor and capacitor 24 is a 10,000 micromicrofarad capacitor, the magnitude of the voltage at output terminals 14, 16 will be one-thousandth of the magnitude of the voltage presented at input terminals 13, 16.

The particular ratio chosen to exist between capacitors 23 and 24 will, of course, depend upon numerous factors which include the magnitude of the input signals being dealt with, the voltage rating of the apparatus receiving the output signal, the capacitor voltage and current ratings, etc. When the input signal is in the 10 to 35 kilovolt region, a voltage division of one thousand, as mentioned above, will result in output voltages between 10 and 35 volts and is therefore a realistic and practical ratio to establish.

Because capacitor 23 may be called upon to drop voltages of up to 35 kilovolts and more, and the source producing such signals often is an extremely high energy source, the possibility of other components being exposed to voltages, and absorbing energies, far in excess of their ratings, must be considered. A failure in capacitor 23 may well lead to capacitor 24 having 35 kilovolts dropped across it when its rating sets its upper limit at a few hundred volts. The same is possible as to resistor 26. A failure in the energy source providing the signal at the input terminals may result in many joules of energy flowing into the capacitance divider network and exceeding even the ratings of capacitor 23. It thus becomes important to provide for such possible malfunctions and failures and thereby minimize their effect. The primary concern, of course, is to the personnel who are in the immediate vicinity of the capacitance divider at the time such failure occurs. Because the energies involved are sufficient to vaporize components at a rate which results in explosion, the network must be properly packaged. For this purpose, metal housing 11 with port holes 19 and 21 is provided (FIGS. 1 and 3). It then becomes important to protect the equipment connected to output terminals 14, 16. If the input signal should, due to a failure of some kind, appear at its original magnitude across the output terminals, severe damage to the equipment attached thereto would result. To prevent this a fuse 27 is positioned between resistor 26 and output terminal 14 so as to form an open circuit therebetween when the current rating of the fuse is exceeded. It is altogether possible, however, with the large voltages which could be involved, that a simple fuse may not supply the safety required, due to possible arcing between its end elements even after it has "blown." Thus an added safety feature is provided in the form of an arc gap 28. When the voltage at the junction point 29, between capacitors 23 and 24, greatly exceeds the value of the voltage designed to exist at this point, an arc will be created between the points of arc gap 28 and thereby form a complete circuit to ground. In this manner, the flow of energy is diverted from the output to ground where it can be safely dissipated.

Referring now to FIG. 3, metal housing 11 has an upper chamber 31 and a lower chamber 32 separated by a circular support member 33 of insulating material. Support member 33 is firmly secured in place as by screws 34. Residing in a central bore in member 33 is a large area, low inductance conductor 36. Conductor 36 has a flange 38 at one end and is secured to member 33 as by screws 37 which pass through the flange and anchor in the support member. Affixed to the other end of conductor 36, which resides in chamber 31, is a capacitor terminal receiving member 39 which acts as a mount for capacitor 23 and also forms a large surface, low inductance, electrical connection between capacitor 23 and conductor 36. Thus terminal 56 of capacitor 23 need not contact conductor 36 directly for proper electrical communication to exist. Electrically connected to end 41 of fixture 36, which resides in chamber 32, are capacitor 24 and resistor 26. A single, large area solder connection securing both capacitor 24 and resistor 26 to conductor 36 is preferred to minimize the inductance of the system.

Although the physical connection between electronic components is generally unimportant to the overall operation of a given circuit, one of the critical features of the present invention is the length of the conductors which connect the various components. It has been found that by maintaining conductors 42 and 48 to a minimum length the amount of ringing which occurs in response to a signal having high harmonic content is greatly reduced. It has been found that by limiting leads 42 and 48 to a length not greater than 1/8 of an inch the maximum amount of reduction in ringing from this source is achieved. Maintaining lead 42 to less than 1/2 inch produced noticeable improvement in the system. Lead 40, between conductor 36 and resistor 26, is also sensitive and maintaining it to a minimum length aids the performance of the capacitor divider as does the same practice to the other leads.

Conductor 43 electrically connects resistor 26 to fuse 27 which, in turn, is connected to output terminal 14 by conductor 44. Output terminal 14 is most advantageously of the coaxial variety having an inner conductor 46 to which conductor 44 is electrically connected and an outer conductor 47 which electrically connects with the housing 11 and thereby with ground terminal 16. Thus the grounded side of capacitor 24 may be conveniently connected by conductor 48 to that portion of terminal 14 which is in contact with housing 11. Inner conductor 46 and outer conductor 47 of terminal 14 are maintained electrically separate as by insulator 49.

The extreme lower end of housing 11 is sealed by a rigid conducting structure member 51 which is firmly secured in place as by a plurality of screws 52. A threaded hole 50 in the center of member 51 provides a convenient means for mounting the invention when such is desired. All of the circuit components, except for capacitor 23, are maintained within chamber 32 which is completely enclosed. In the event of an electrical failure which results in vaporization of components, the components will be within chamber 32 protecting personnel in the area. A possible explosion is prevented by allowing the gases of vaporizing components to escape through port holes 19.

Arc gap 28, described in connection with FIG. 2, is formed by a screw 53 which is secured in end disc 51 and extends to within close proximity of fixture 36. Gap 28 can, however, be formed by any conductive member secured at one end to ground and placed in close proximity to conductor 36.

Capacitor 23 which is capable of having voltages in the kilovolt region placed across it has an evacuated glass enclosure 54 which houses the capacitive forming elements, and has a pair of connection terminals 56 which communicate electrically with the interior of the enclosure 54. As pointed out above, one terminal 56 is supported in receiving member 39 to form electrical connection with fixture 36 and to be physically mounted. Upper terminal 56 is also maintained within a receiving member 57 which is of the same general variety as member 39. Receiving member 57 also serves to structurally support capacitor 23 and at the same time form a large area, low inductance electrical connection between the upper terminal 56 and input terminal 13. The electrical connection between member 57 and input terminal 13 is formed by means of a disc 58 of conductive material to which member 57 is secured and a standard terminal pole 59, which is affixed to disc 58. Pole 59 passes through upper end cover 22 and is secured thereto as by locking nut 61.

The upper end 18 of housing 11 is sealed by means of end closure member 22 which is integrally connected to an upwardly extending cylinder 17 for surrounding terminal 13, and a downwardly extending cylinder 62 for surrounding upper capacitor terminal 56. The single cap member 63 formed by cylinders 17 and 62 and top closure member 22 is constructed from non-conductive material having good insulating properties. The function of upwardly extending cylinder 17 has been explained above. Closure member 22 serves to form completely enclosed chamber 31 to safeguard against possible explosion or similar failure of capacitor 23. Holes 21 in member 22 allow gases to escape from chamber 31 when a failure causes them to build up pressure therein. Member 22 also serves as a mounting structure for terminal 13 and capacitor terminal receiving member 57.

Cylinder 62 which extends downwardly into housing 11 surrounds upper capacitor terminal 56 which is the high voltage terminal. Voltages of up to 35 kilovolts will often appear on upper terminal 56. Since the interior of housing 11 is not evacuated, arcing from upper terminal 56 to other conductors is a most serious problem. The problem is initially reduced by providing insulating material 64 over the interior area of compartment 31 of housing 11. A material which is most suitable for lining the interior of housing 11 is a sheet plastic material of polyethylene terephthalate, sold by the E. I. du Pont Co. under the name "Mylar." Although numerous materials are suitable this material is especially attractive because of its high insulating characteristics even in rather thin sheets of material. Even with the Mylar lining, however, it has been found that arcing will occur between upper terminal 56 (or the conductive members in contact therewith such as members 57 or 58) and the upper end of housing 11. Downwardly extending cylinder 62 provides the additional insulation around high voltage terminal 56 to prevent arcing. The lower terminal 56 is the low voltage terminal, not expected to be at any more than about 100 volts potential at any time, and therefore does not pose an arcing problem.

Cap member 63 can be secured in place in any of a variety of ways with the requirement that no metallic screws or the like protrude into the insulator so as to establish a conductive path which might induce arcing. The present invention shows as an embodiment in which a plurality of screws 65 pass through threaded holes in housing 11 and abut rather than penetrate cap 63 and thereby maintain it in position by simple compressive forces.

Ground terminal 16 is secured to housing 11 by any appropriate means which forms an electrical contact therewith whether it be a rivet or a bolt or other such securing means. By forming an electrical connection between the housing 11 and ground terminal 16, the housing is maintained at ground potential making it safe to handle and preventing shocks and the like. Housing 11 provides a feature other than blast protection in that its metallic composition shields capacitor 23 from radiating noise signals out and protects the system from radiated signals getting in, as well as generally improving the system performance.

A capacitance voltage divider in accordance with the teachings of the present invention and having the following specification:

Size—10 inches long by 3 inches in diameter
Capacitor 23—6 micromicrofarad vacuum capacitor with 35 kv. rating
Capacitor 24—$6\times10^3$ micromicrofarad mica capacitor
Resistor 26—220 ohms
Load—20 micromicrofarad 1 megohm
Lead from terminal 14 to load—2 ft. RG-62/U cable
Length of leads 42 and 48≈⅛"

produced an output pulse (onto the screen of an oscilloscope) which had a .04 microsecond rise and fall time, in response to a 20 kv. input pulse which had a rise and fall time of .02 microsecond. There was no visible ringing of the reproduced pulse even though it was one of high harmonic content.

Although the invention has been described mainly with reference to an upper signal voltage limit of 35 kv. and a capacitor 23 of 10 micromicrofarads, a series connection of two vacuum capacitors each having twice the capacitance value that a single capacitor would be designed to have, would allow voltages of 70 kv. or more to be handled. Capacitor 23 is generally most advantageously of the lowest capacitance value that such a capacitor can be obtained at. 1 micromicrofarad capacitors of this description are obtainable from some sources. The invention is thus capable of outstanding performance with a variety of component values as long as the manner of arranging and packaging the components is in accord with the teachings herein.

What is claimed is:

1. In a capacitance voltage divider the combination comprising a rigid metal cylindrical housing, a high voltage vacuum capacitor having a high voltage terminal and a low voltage terminal axially mounted within said housing, an input terminal electrically connected to the high voltage terminal of said capacitor and extending exteriorly of said housing, insulating material disposed between said housing and said capacitor, a low inductance capacitor mounted within said housing electrically connected at one of its sides to the low voltage terminal of said vacuum capacitor and having a capacitance value at least an order of magnitude greater than said vacuum capacitor, an output terminal extending exteriorly of said housing and electrically connected to the low voltage terminal of said vacuum capacitor, a ground terminal affixed to said housing and in electrical contact therewith, the other side of said low inductance capacitor electrically connected to said ground terminal, and end members secured at either end of said housing.

2. The capacitance voltage divider of claim 1 further comprising a resistive element electrically interposed between said output terminal and the low voltage terminal of said vacuum capacitor.

3. In a capacitance voltage divider the combination comprising a cylindrical metal housing, a non-conductive support member having a central bore therethrough secured within said housing and dividing said housing into an upper and lower chamber, a low inductance conductive member secured within the central bore of said support member and having an upper face in said upper chamber and a lower face in said lower chamber, a vacuum capacitor having a low voltage terminal and a high voltage terminal axially mounted within said upper chamber, a first vacuum capacitor mounting means secured to the upper face of said conductive member and forming a low inductance electrical connection between the low voltage terminal of said vacuum capacitor and said conductive member, an upper cap member of non-conductive material secured to the upper end of said housing, a high voltage connection terminal extending through said upper cap, a second vacuum capacitor mounting means within said housing and secured to said high voltage connection terminal and forming a low inductance electrical connection between said connection terminal and the high voltage terminal of said vacuum capacitor, a low inductance capacitor having a capacitance value at least one order of magnitude greater than said vacuum capacitor mounted in said lower chamber, a first conductor electrically connecting one side of said low inductance capacitor to the lower face of said conductive member, an output terminal accessible from the exterior of said housing, a second conductor electrically connecting said output terminal to the lower face of said conductive member, a third conductor electrically connecting the other side of said low inductance capacitor to said housing, a ground terminal affixed to and in electrical contact with said housing, and a lower end cap of conductive material secured to the lower end of said housing.

4. The capacitance voltage divider of claim 3 wherein said first and second conductors are less than one-half inch in length.

5. The capacitance voltage divider of claim 3 further comprising a resistive element electrically interposed in said second conductor.

6. The capacitance voltage divider of claim 3 further comprising a series connected resistive element and current limiting fuse interposed in said second conductor, and a gap forming conductor electrically connected at one end to said housing and in close proximity to said conductive member at its other end.

7. The capacitance voltage divider of claim 3 further comprising insulating material disposed between said vacuum capacitor and said housing.

8. The capacitance voltage divider of claim 7 further comprising a first cylindrical member of insulating material integrally connected to said upper cap and surrounding at a distance said high voltage connection terminal, a second cylindrical member of insulating material within said housing integrally connected to said upper cap and surround said high voltage terminal of said vacuum capacitor.

9. The capacitance voltage divider of claim 8 wherein said upper chamber and said lower chamber both have exhaust port holes therein.

References Cited in the file of this patent

UNITED STATES PATENTS

| | | |
|---|---|---|
| 2,255,502 | Bousman | Sept. 9, 1941 |
| 2,714,703 | Ruderfer | Aug. 2, 1955 |
| 2,906,925 | Yonkers et al. | Sept. 29, 1959 |